M. PAGE.
OILING DEVICE.
APPLICATION FILED JULY 31, 1913.
1,098,587.
Patented June 2, 1914.
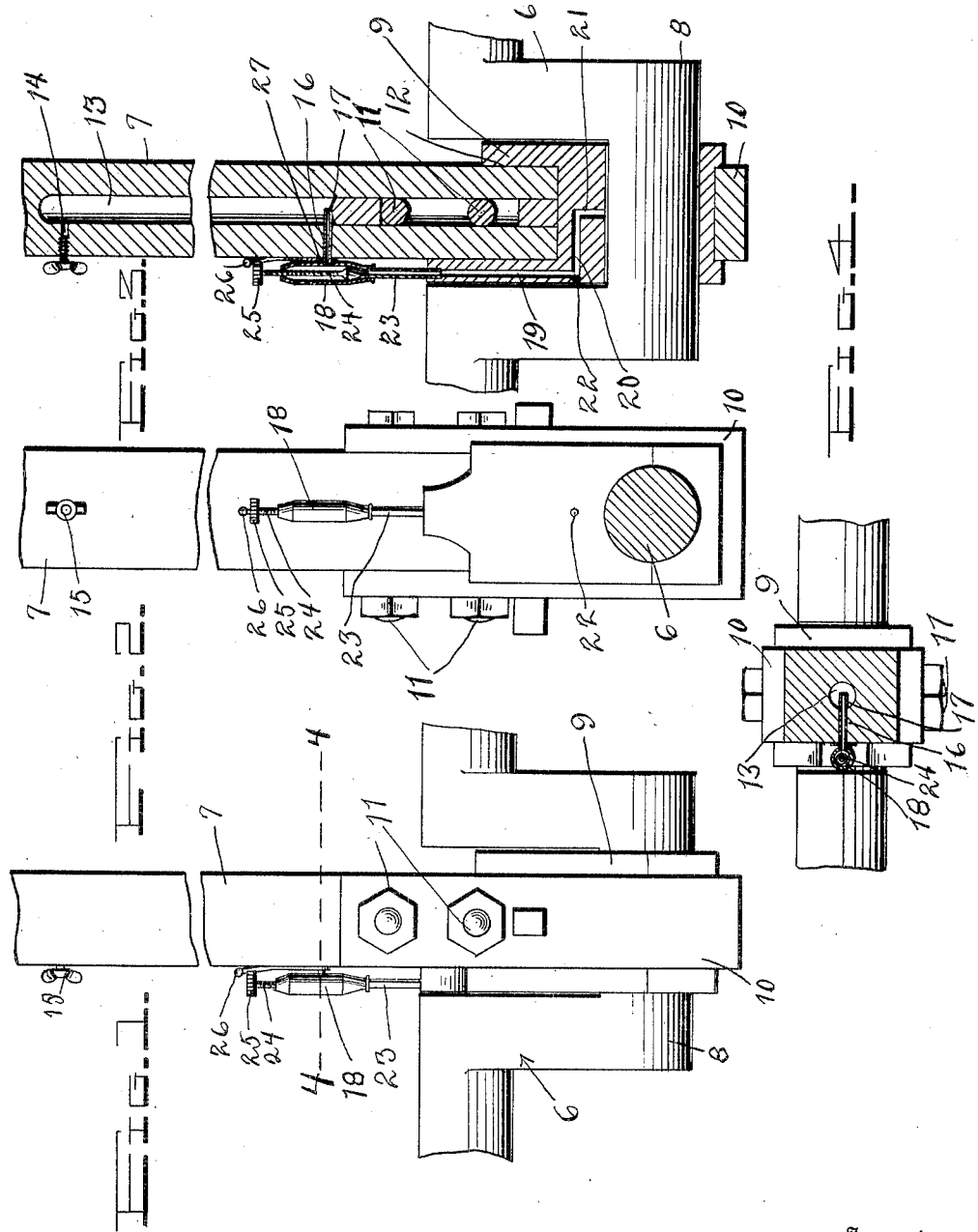
Witnesses
Arthur K. Moore
Frank S. Ratcliff
Inventor
M. Page
By
Attorney

UNITED STATES PATENT OFFICE.

MICHAEL PAGE, OF SCHUYLKILL HAVEN, PENNSYLVANIA.

OILING DEVICE.

1,098,587.

Specification of Letters Patent.

Patented June 2, 1914.

Application filed July 31, 1913. Serial No. 782,337.

*To all whom it may concern:*

Be it known that I, MICHAEL PAGE, a citizen of the United States, residing at Schuylkill Haven, in the county of Schuylkill, State of Pennsylvania, have invented certain new and useful Improvements in Oiling Devices; and I do hereby declare the following to be a full, clear, and exact description of the invention, such as will enable others skilled in the art to which it appertains to make and use the same.

This invention relates to new and useful improvements in oiling devices and has particular reference to gravity fed oiling devices.

The object of the invention resides in the provision of means whereby a pitman may be longitudinally bored and said bore utilized as an oil reservoir for oiling the crank shaft and the invention further contemplates the provision of means whereby the flow of oil from the said reservoir may be regulated at will.

A further object of the invention resides in the provision of such a device which is so simply designed that it may be put in operation at a comparatively low cost.

With these and other objects in view the invention resides in the novel combination, formation and arrangement of parts to be more fully hereinafter described and illustrated in the accompanying drawings and particularly pointed out in the claims hereto appended.

Reference is had to the accompanying drawings wherein similar characters of reference designate corresponding parts throughout the several views, and in which:

Figure 1 is a top plan view of the device, Fig. 2 is a side elevational view thereof, Fig. 3 is a horizontal sectional view therethrough and Fig. 4 is a sectional view on the line 4—4 of Fig. 1.

Referring now more particularly to the drawings, wherein is shown the preferred embodiment of the invention 5 designates the crank shaft which is connected to the pitman 7. Surrounding the offset portion 8 of the crank shaft is a bearing 9 and a U-shaped member 10 connects the bearings and the adjacent end of the pitman by means of the usual wedge key and bolts 11 passed therethrough, the end of the pitman seating in a socket 12 in the bearing.

The pitman is provided with a bore 13 which extends from its end adjacent the bearing to a point adjacent its other end and from said last-named end a smaller bore 14 extends laterally to the surface of the pitman whereby the main bore may be filled with oil, a suitable plug 15 being provided for closing the bore 14. Extending to the main bore at a point inwardly of and adjacent the outermost securing bolt 11 is a small bore 16 wherein is seated a lateral extension 17 of a valve casing 18. The bushing is provided with a bore 19 which extends parallel to the pitman and from its surface adjacent the valve casing to a point adjacent and spaced from the offset portion of the crank shaft. A bore 20 is provided transversely in the boxing and communicating with the bore 19, said bore 20 terminating adjacent the central axis of the pitman and communicating with a bore 21, opening upon the inner periphery of the bearing, the outer end of the bore 20 being closed by a plug 22. A pipe 23 extends from the valve casing to the outer end of the bore 19.

From the foregoing it is observed that the oil passes from the main reservoir or bore through the bore 16 into the valve casing and from thence through the pipe 23 and bore 19 to the bore 20 from whence it passes through the short bore 21 to the inner periphery of the bushing to properly lubricate the same.

To regulate the flow of oil, a valve stem 24 is disposed in the valve casing and has threaded engagement therewith, the inner end of the valve stem carrying a head 25 whereby rotation of the valve stem actuates the head to regulate the supply of oil. The valve stem extends outwardly of the casing and is provided with a wheel 25 for rotating the same. To lock the stem against undesired rotation the periphery of the wheel is provided with a plurality of ratchet teeth and a spring pawl 26 is provided normally engaging the teeth. This pawl is held in place by forming one end thereof with a bore 27 through which is passed the extension 17 of the valve casing.

To prevent leakage of oil from the main bore at the bearing end of the pitman, a plug is disposed in this end and is securely held in place by the bolts 11 and by the inner end of the extension of the valve casing, which is disposed in the bore, as shown.

It is thus observed that a very simple arrangement has been provided whereby a constant flow of oil may be provided for lubricating the crank shaft. It is understood that the application of this device is not limited to a pitman and as it may be embodied in any similar structure.

It will be understood that various minor changes and modifications within the scope of the appended claims may be made without departing in any manner from the spirit of the invention.

What is claimed is:

1. An oiling device comprising the combination with a connecting rod and a shaft bearing at one end thereof, of the rod being provided with a longitudinal bore forming an oil reservoir and an outlet bore adjacent the bearing, a valve casing having an extension seated in the last bore, a stem and head in the casing and the bearing being suitably bored and the valve casing communicating therewith whereby oil is supplied to the inner periphery of the bearing.

2. An oiling device comprising the combination with a connecting rod and a shaft bearing at one end thereof, of the rod being provided with a longitudinal bore forming an oil reservoir and an outlet bore adjacent the bearing, a valve casing having an extension seated in the last bore, a stem and head in the casing and the bearing being suitably bored and the valve casing communicating therewith whereby oil is supplied to the inner periphery of the bearing.

3. An oiling device comprising the combination with a reservoir and a feed pipe, of a valve casing, an extension on said casing communicating with the reservoir, a valve stem threaded in the casing, a head on the stem, the outer end of the stem being provided with a wheel having ratchet teeth on its periphery and a spring pawl bored at its lower end to receive the extension whereby it is held by the extension and the reservoir with its upper end resiliently engaging the teeth.

In testimony whereof, I affix my signature, in the presence of two witnesses.

MICHAEL PAGE.

Witnesses:
 JOHN H. BYERLY,
 J. O. MILLER.

Copies of this patent may be obtained for five cents each, by addressing the "Commissioner of Patents, Washington, D. C."